(12) United States Patent
Ohashi et al.

(10) Patent No.: US 11,794,673 B2
(45) Date of Patent: Oct. 24, 2023

(54) ELECTRONIC DEVICE

(71) Applicant: KABUSHIKI KAISHA TOKAI RIKA DENKI SEISAKUSHO, Aichi (JP)

(72) Inventors: Yosuke Ohashi, Aichi (JP); Shigenori Nitta, Aichi (JP); Satoshi Mori, Aichi (JP); Tetsuya Kobayashi, Toyota (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 142 days.

(21) Appl. No.: 17/602,106

(22) PCT Filed: Feb. 26, 2020

(86) PCT No.: PCT/JP2020/007567
§ 371 (c)(1),
(2) Date: Oct. 7, 2021

(87) PCT Pub. No.: WO2020/208956
PCT Pub. Date: Oct. 15, 2020

(65) Prior Publication Data
US 2022/0194307 A1    Jun. 23, 2022

(30) Foreign Application Priority Data

Apr. 12, 2019   (JP) ................................. 2019-076303

(51) Int. Cl.
*B60R 16/023* (2006.01)
(52) U.S. Cl.
CPC ................................. *B60R 16/023* (2013.01)

(58) Field of Classification Search
None
See application file for complete search history.

(56) References Cited

U.S. PATENT DOCUMENTS 7,301,441 B2 * 11/2007 Inada .................... B60R 25/257
340/426.36
2013/0159332 A1   6/2013 Matsubayashi et al.
2018/0029538 A1 * 2/2018 Matsushita ......... H04M 1/6091

FOREIGN PATENT DOCUMENTS

| JP | 2008-193718 | 8/2008 |
| JP | 2011-164826 | 8/2011 |
| JP | 2013-125428 | 6/2013 |

OTHER PUBLICATIONS

International Search Report issued in International Patent Application No. PCT/JP2020/007567, dated May 26, 2020, along with an English translation thereof.

* cited by examiner

*Primary Examiner* — Jared Fureman
*Assistant Examiner* — Aqeel H Bukhari
(74) *Attorney, Agent, or Firm* — Greenblum & Bernstein, P.L.C.

(57) ABSTRACT

This electronic device, which is used while being assembled at a mounting position of an assembling target, includes: a plurality of terminals configured to receive a plurality of input signals and a mounting position registration unit that determines and registers a mounting position on the basis of a combination of input states of the plurality of terminals including the plurality of input signals received through the plurality of terminals.

4 Claims, 4 Drawing Sheets

|  | 1st Input Terminal | 2nd Input Terminal | Mounting Position |
|---|---|---|---|
| 1st Electronic Device 2a | OPEN | OPEN | A |
| 2nd Electronic Device 2b | OPEN | GND | B |
| 3rd Electronic Device 2c | GND | OPEN | C |
| 4th Electronic Device 2d | GND | GND | D |

ELECTRONIC DEVICE

TECHNICAL FIELD

The following disclosure relates to an electronic device that can register a mounting position of the electronic device.

BACKGROUND ART

In typical mass-produced electronic devices, each device is mounted at a position that is registered to allow the device to be actuated in correspondence with its mounting position. For example, each electronic device may be shaped differently to prevent the electronic devices from being arranged at erroneous mounting positions. Further, in a known technique, the mounting pattern of electronic devices is registered in advance to a separate device. Then, after the electronic devices are mounted at certain locations, the actual mounting pattern of the electronic devices is compared with the registered pattern to detect erroneous mounting (refer to Patent Document 1).

PRIOR ART LITERATURE

Patent Document

Patent Document 1: Japanese Laid-Open Patent Publication No. 2013-125428

SUMMARY OF THE INVENTION

When the electronic devices are shaped differently, the number of types of the electronic devices will increase, and many subjects will have to be managed. Also, when the electronic devices are shaped differently, common components cannot be used and thereby costs are increased.

An objective of the present disclosure is to provide an electronic device that allows mounting position registration to be simplified.

In accordance with one aspect of the present disclosure, an electronic device is coupled to a coupling subject at a mounting position for use. The electronic device includes terminals and a mounting position registration unit. The terminals are configured to receive input signals. The mounting position registration unit determines and registers the mounting position based on a combination of input states of the terminals that receive the input signals.

The present disclosure simplifies mounting position registration.

MODES FOR CARRYING OUT THE INVENTION

First Embodiment

A first embodiment of an electronic device will now be described with reference to FIGS. 1 to 4.

Figure 1:
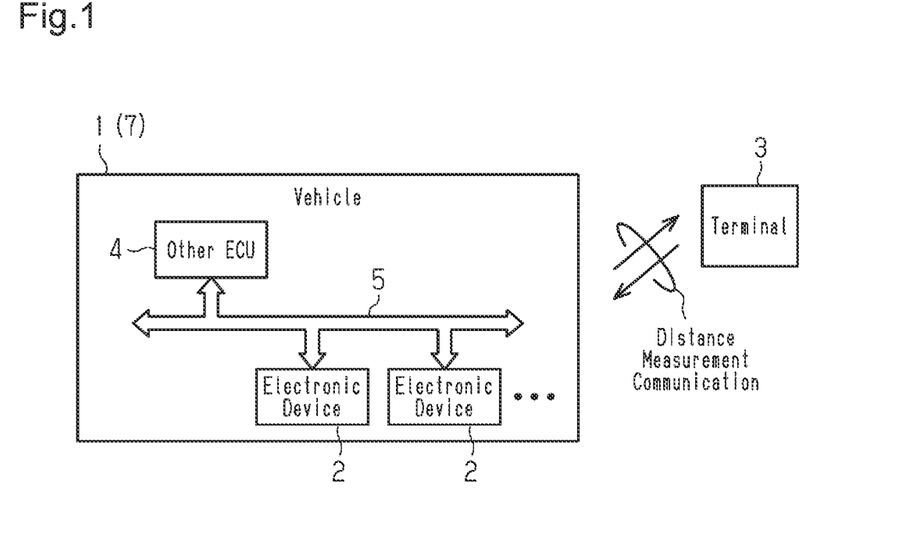
FIG. 1 is a diagram showing the configuration of a vehicle in accordance with a first embodiment.

As shown in FIG. 1, a vehicle 1 includes electronic devices 2 that perform various actions in the vehicle 1. For example, each electronic device 2 is a communication device used to measure distance from a terminal 3, which serves as a key of the vehicle 1, through wireless communication to determine whether the positional relationship between the electronic device 2 and the terminal 3 is appropriate. In the distance measurement communication, for example, radio waves on ultra wide band (UWB) are transmitted and received between the electronic device 2 and the terminal 3 to measure the distance between the electronic device 2 and the terminal 3 from the propagation time of the radio waves. The electronic devices 2 are connected to communication lines 5 in the vehicle 1 and actuated while performing communication with other electronic control unit (ECU) 4 through the communication lines 5.

The electronic device 2 establishes distance measurement communication with the terminal 3, for example, when the vehicle 1 and the terminal 3 perform ID verification (key verification) through wireless communication. The electronic device 2 validates successful ID verification when a measurement value of the distance measurement communication is less than a permissible value. This allows the vehicle 1 to be operated by the terminal 3. The electronic device 2 invalidates successful ID verification when the measurement value of the distance measurement communication is greater than or equal to a permissible value. Thus, for example, when there is a likelihood of a relay or the like being used to establish unauthorized communication with the terminal 3 to accomplish ID verification, unauthorized use of the vehicle 1 is prevented by invaliding ID verification.

Figure 2:
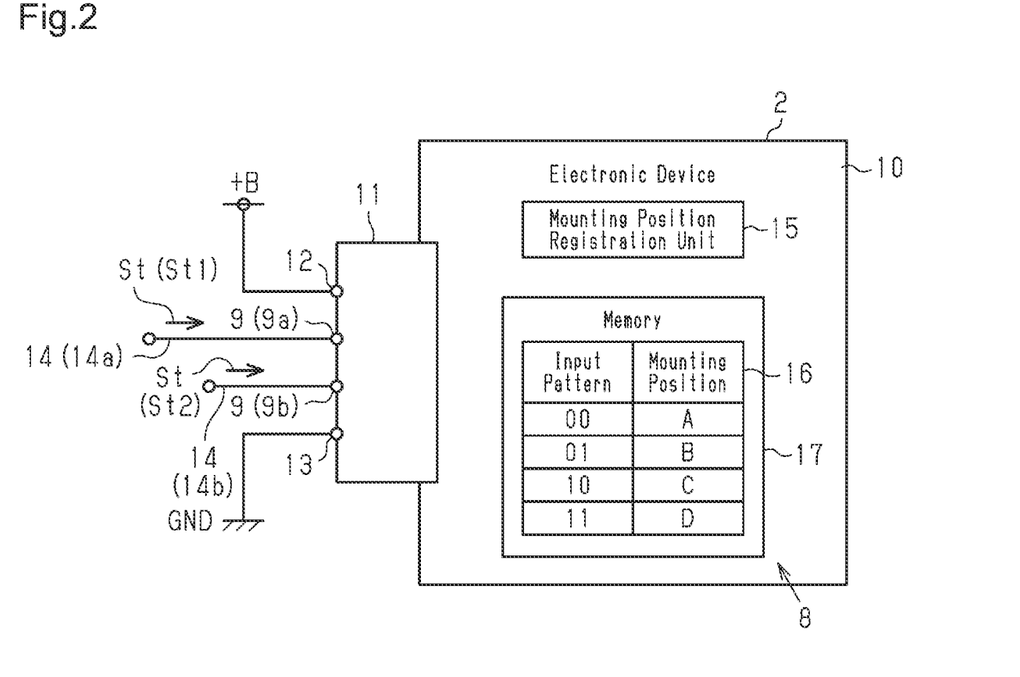
FIG. 2 is a diagram showing the configuration of an electronic device.

As shown in FIG. 2, mounting positions of the electronic devices 2 on a coupling subject 7 can be registered to the electronic devices 2 by a mounting position registration system 8. The mounting position registration system 8 includes the electronic devices 2 and the coupling subject 7. The coupling subject 7 includes the mounting positions where the electronic devices 2 are mounted. For example, the coupling subject 7 is the vehicle 1 on which the electronic devices 2 are mounted. The electronic devices 2 in the present example may be identical in shape. The electronic devices 2 are coupled to the coupling subject 7 at the corresponding mounting positions for use. The mounting positions of the electronic devices 2 on the coupling subject 7 are not designated in advance. Each electronic device 2 includes terminals 9 configured to receive input signals St. In the present example, the mounting position registration system 8 determines a mounting position from an input pattern, that is, a combination of the input signals St received by the terminals 9, and registers the mounting position to the corresponding electronic device 2. Mounting positions include, for example, vehicle body front right side, vehicle body front left side, vehicle body rear right side, vehicle body rear left side, and vehicle interior.

Each electronic device 2 includes a main body 10 and a connector 11. The connector 11 includes the terminals 9, a power supply terminal 12, and a ground terminal 13. The terminals 9 are used to determine the mounting position of the electronic device 2. Each terminal 9 can be in a state disconnected from a wire 14 and a state connected to the wire 14. In the state in which the terminal 9 is connected to the wire 14, the terminal 9 receives an input signal St that is set at a low level or an input signal St that is set at a high level. The power supply terminal 12 is connected to, for example, the power supply +B of the vehicle 1. The ground terminal 13 is connected to ground (GND).

In the present example, the terminals 9 include two terminals, namely, a first input terminal 9a and a second input terminal 9b. The first input terminal 9a receives an input signal St1, which is used to determine the mounting position of the electronic device 2, via wire 14a. The second input terminal 9b receives an input signal St2, which is used to determine the mounting position of the electronic device 2, via wire 14b. In the present example, both of the first input terminal 9a and the second input terminal 9b are connected to ground GND to receive low signals and connected to the power supply +B to receive high signals. Further, when the first input terminal 9a and the second input terminal 9b are not connected to the power supply +B and ground GND, the first input terminal 9a and the second input terminal 9b are in an open state and do not receive signals.

Each electronic device 2 includes a mounting position registration unit 15. The mounting position registration unit 15 determines and registers the mounting position based on a combination of input states of the terminals 9 that receive input signals St (St1, St2). The mounting position registration unit 15 determines the mounting position of the electronic device 2 from the combination of at least three states, namely, a state disconnected from the wire 14, a state in which an input signal St having a low level is received, and a state in which an input signal St having a high level is received. In the present example, the mounting position registration unit 15 determines the mounting position of the electronic device 2 from the input pattern of the input signals St1 and St2 received by the first input terminal 9a and the second input terminal 9b. The input pattern of the present example is, for example, a combination of binary codes ("0" and "1"). The former stage of the pattern (left side of two-digit value) indicates the input state of the input signal St1, and the latter stage of the pattern (right side of two-digit value) indicates the input state of the input signal St2.

In the present example, when the terminal 9 is open, the binary code is "0". Further, when the terminal 9 receives a low signal, the binary code is "1". In this manner, in the present example, the electronic device 2 checks whether the terminal 9 is open or receiving a low signal. The electronic device 2 does not use a high signal as an input signal of the terminal 9.

The electronic device 2 includes a memory 17 that stores a table 16 in which the input patterns of input signals St (St1, St2) are associated with the mounting positions. In the table 16 of the present example, input pattern "00" is registered as mounting position "A", input pattern "01" is registered as mounting position "B", input pattern "10" is registered as mounting position "C", and input pattern "11" is registered as mounting position "D". The mounting position registration unit 15 refers to the table 16 based on the input pattern of the input signals St1 and St2 to determine the mounting position.

The operation of the electronic device 2 in accordance with the present embodiment will now be described with reference to FIGS. 3 and 4.

Figure 3:
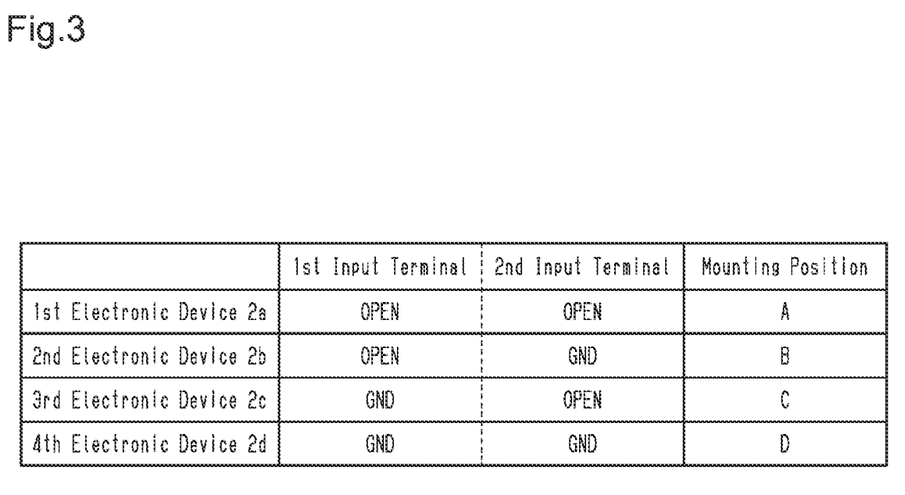
FIG. 3 is a table showing the correlation between input patterns of input signals and mounting positions of electronic devices.

As shown in FIG. 3, when a first electronic device 2a is coupled to the vehicle body, the first input terminal 9a and the second input terminal 9b are both "OPEN". That is, both of the first input terminal 9a and the second input terminal 9b are disconnected from the wire 14. In this case, the input pattern of the input signals St of the first input terminal 9a and the second input terminal 9b is "00". Accordingly, the mounting position registration unit 15 of the first electronic device 2a checks the input pattern "00" in the table 16 and acknowledges "A" as the mounting position corresponding to the input pattern "00". Then, the mounting position registration unit 15 of the first electronic device 2a determines that the mounting position of the first electronic device 2a is "A" and stores "A" in the memory 17 of the first electronic device 2a. In other words, the mounting position registration unit 15 of the first electronic device 2a checks the input pattern "00" in the table 16, determines that the mounting position of the first electronic device 2a is mounting position "A" corresponding to the input pattern "00", and writes the determined mounting position "A" to the memory 17 of the first electronic device 2a.

When a second electronic device 2b is coupled to the vehicle body, the first input terminal 9a is "OPEN", and the second input terminal 9b is "GND". When the second input terminal 9b is set to GND, this indicates a low level (input of low signal). In this case, the input pattern of the input signals St of the first input terminal 9a and the second input terminal 9b is "01". Accordingly, the mounting position registration unit 15 of the second electronic device 2b checks the input pattern "01" in the table 16 and acknowledges "B" as the mounting position corresponding to the input pattern "01". Then, the mounting position registration unit 15 of the second electronic device 2b determines that the mounting position of the second electronic device 2b is "C" and stores "C" in the memory 17 of the second electronic device 2b. In other words, the mounting position registration unit 15 of the second electronic device 2b checks the input pattern "01" in the table 16, determines that the mounting position of the second electronic device 2b is mounting position "B" corresponding to the input pattern "01", and writes the determined mounting position "B" to the memory 17 of the second electronic device 2b.

When a third electronic device 2c is coupled to the vehicle body, the first input terminal 9a is "GND", and the second input terminal 9b is "OPEN". In this case, the input pattern of the input signals St of the first input terminal 9a and the second input terminal 9b is "10". The mounting position registration unit 15 of the third electronic device 2c refers to the table 16 and determines that the mounting position of the third electronic device 2c is the mounting position C. Then, the mounting position registration unit 15 of the third electronic device 2c stores the mounting position "C" as the mounting position of the third electronic device 2c in the memory 17 of the third electronic device 2c.

When a fourth electronic device 2d is coupled to the vehicle body, the first input terminal 9a is "GND", and the second input terminal 9b is "GND". In this case, the input pattern of the input signals St of the first input terminal 9a and the second input terminal 9b is "11". The mounting position registration unit 15 of the fourth electronic device 2d refers to the table 16 and determines that the mounting position of the fourth electronic device 2d is the mounting position "D". Then, the mounting position registration unit 15 of the fourth electronic device 2d stores the mounting position "D" as the mounting position of the fourth electronic device 2d in the memory 17 of the fourth electronic device 2d.

Figure 4:
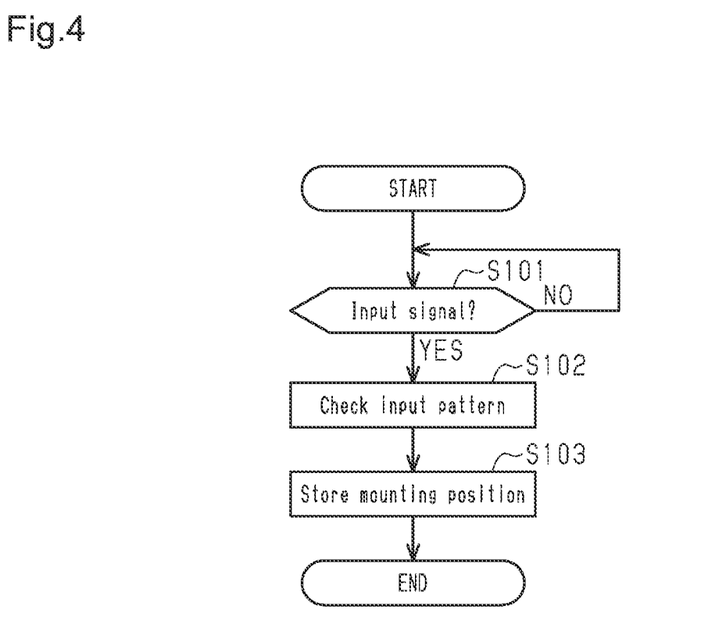
FIG. 4 is a flowchart illustrating a process executed for determination of a mounting position.

FIG. 4 illustrates the operation of the mounting position registration unit 15. Preferably, the process of the flowchart shown in FIG. 4 is started, for example, when the power supply +B is connected to the power supply terminal 12 in the electronic device 2.

In step 101, the mounting position registration unit 15 determines whether the terminals 9 (first input terminal 9a and second input terminal 9b) of the electronic device 2 have received an input signal St. When an input signal St is received, the mounting position registration unit 15 proceeds to step 102. When an input signal St is not received, the mounting position registration unit 15 remains in step 101.

In step 102, the mounting position registration unit 15 checks the input pattern of the input signals St received from the terminals 9. In this case, the mounting position registration unit 15 checks the received input pattern with the table 16 and acknowledges the mounting position corresponding to the received input pattern.

In step 103, the mounting position registration unit 15 stores the mounting position, which is obtained by referring to the table 16, in the memory 17 of the electronic device 2. In this manner, the mounting position is registered to the electronic device 2.

The electronic device of the above embodiment has the following advantages.

(1) The mounting position registration unit 15 of the electronic device 2 determines and registers the mounting position of the electronic device 2 based on a combination of the input states of the terminals 9 that receive input signals St. Since the electronic devices 2 are associated with the mounting positions, the electronic devices 2 do not have to be shaped differently. This eliminates the time and costs that would be required if the electronic devices 2 were to be shaped differently. Thus, the mounting position registration of the electronic device 2 is simplified.

(2) The electronic device 2 includes the table 16 in which the input patterns of the input signals St are associated with the mounting positions. The mounting position registration unit 15 refers to the table 16 to determine the mounting position based on the input pattern. Thus, the mounting position of the electronic device 2 can be identified and registered by simply referring to the table 16 and searching for the input pattern of the input signals St, which are received by the terminals 9 of the electronic device 2.

(3) Each of the terminals 9 receives an input signal St that is set at a low level or an input signal St that is set at a high level via the wire 14. The mounting position registration unit 15 determines and registers the mounting position from the combination of at least three states, namely, a state in which the terminal 9 is disconnected from the wire 14, a state in which the terminal 9 receives an input signal St having a low level, and a state in which the terminal 9 receives an input signal St having a high level. This allows the combination of the input signals St to be set by simply setting the terminals 9 of the electronic device 2 in an open state, a low-signal receiving state, and a high-signal receiving state. Thus, the mounting position registration of the electronic device 2 is further simplified.

Second Embodiment

A second embodiment will now be described with reference to FIGS. 5 to 7. The second embodiment is an example in which the mounting position determination process is changed from the first embodiment. Therefore, elements that are the same as the first embodiment will not be described, and only differences from the first embodiment will be described in detail.

Figure 5:
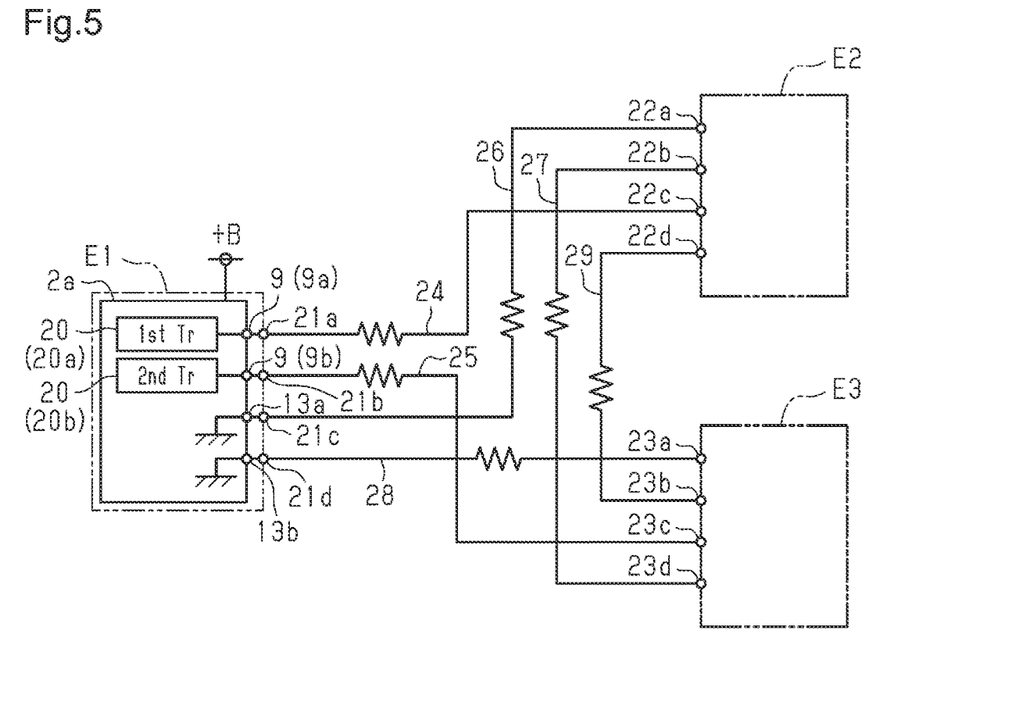
FIG. 5 is a diagram showing actuation of an electronic device when determining a mounting position in accordance with a second embodiment.
Figure 6:
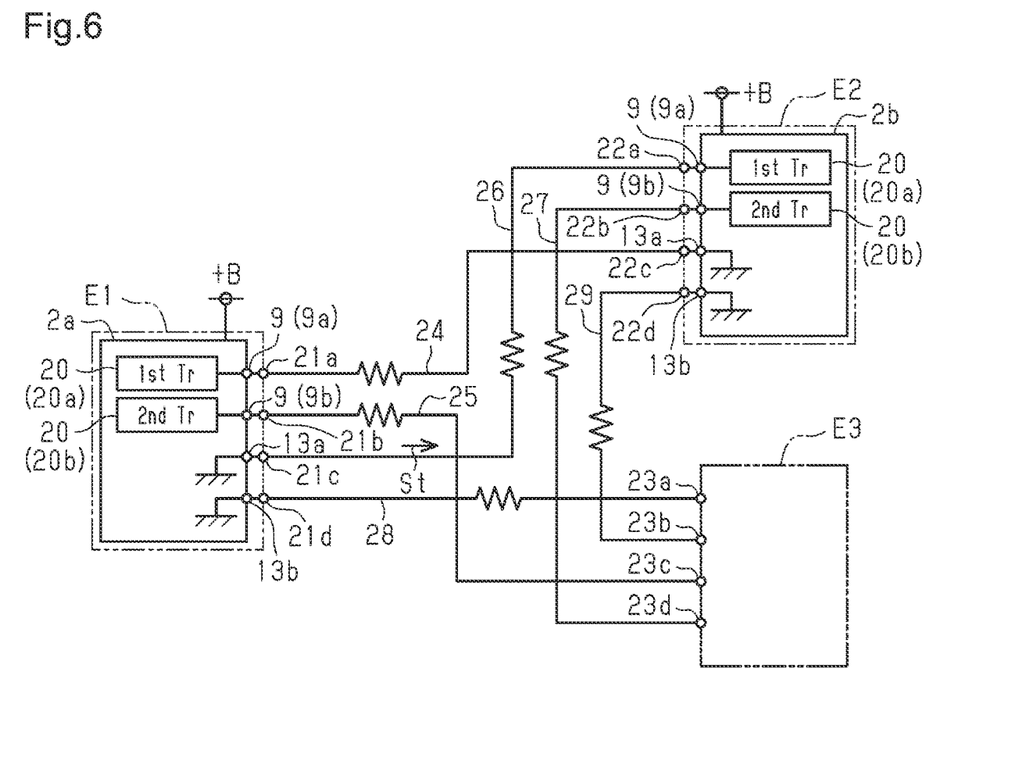
FIG. 6 is a diagram showing actuation of an electronic device when determining a mounting position.
Figure 7:
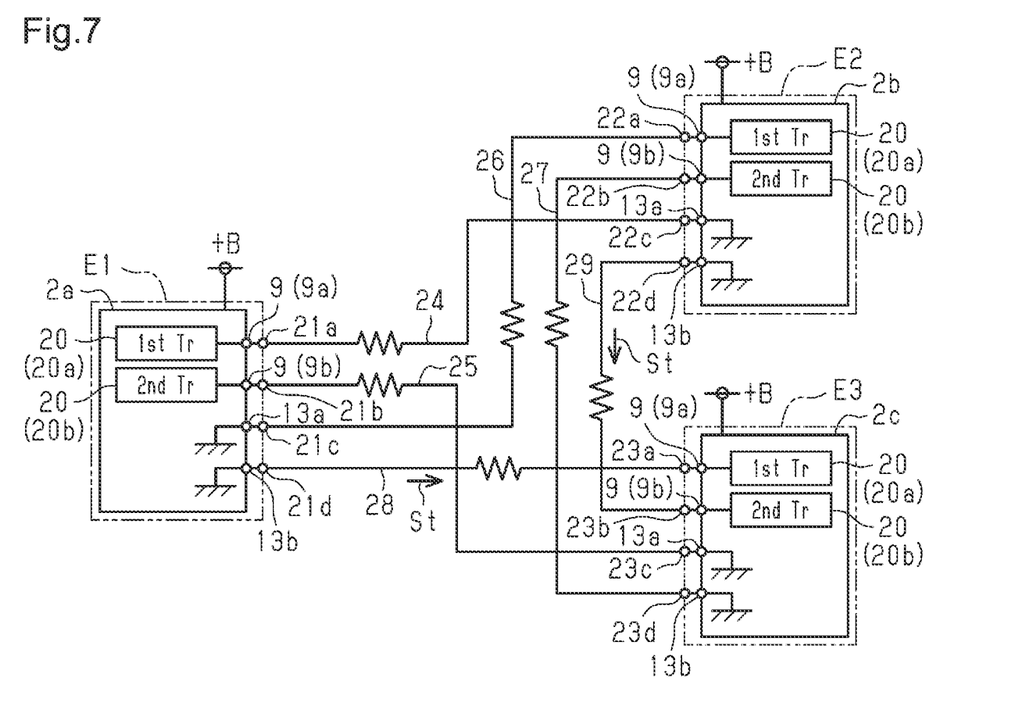
FIG. 7 is a diagram showing actuation of an electronic device when determining a mounting position.

As shown in FIGS. 5 to 7, the electronic device 2 includes at least one switching element 20 that is actuated during the mounting position registration. In the present example, the electronic device 2 includes a number of switching elements 20. The switching elements 20 are connected to the terminals 9. In the example shown, the electronic device 2 includes a first switching element 20a and a second switching element 20b. The first switching element 20a is connected to the first input terminal 9a, and the second switching element 20b is connected to the second input terminal 9b. Further, the electronic device 2 includes ground terminals 13. In the present example, the electronic device 2 includes a first ground terminal 13a and a second ground terminal 13b. The number of the switching elements 20 (terminals 9) is two and the number of the ground terminals 13 is two in the illustrated example. However, the numbers are changed in accordance with the number of the mounted electronic devices 2.

The first electronic device 2a, the second electronic device 2b, and the third electronic device 2c are mounted in the illustrated and described example. The first electronic device 2a is mounted at a first mounting position E1, the second electronic device 2b is mounted at a second mounting position E2, and the third electronic device 2c is mounted at a third mounting position E3.

Ports are arranged at each mounting position of the coupling subject 7 in correspondence with the terminals of the corresponding electronic device 2. The ports of one mounting position are connected to the ports of at least another one of the other mounting positions. In the present example, a port 21a is connected to the first switching element 20a of the electronic device 2 arranged at the first mounting position E1, and the port 21a is connected by a wire 24 to a port 22c that is connected to the first ground terminal 13a of the electronic device 2 arranged at the second mounting position E2. A port 21b is connected to the second switching element 20b of the electronic device 2 arranged at the first mounting position E1, and the port 21b is connected by a wire 25 to a port 23c that is connected to the first ground terminal 13a of the electronic device 2 arranged at the third mounting position. Similarly, at the second mounting position E2, a port 22a is connected to a port 21c at the first mounting position E1 by a wire 26, and a port 22b is connected to a port 23d at the third mounting position E3 by a wire 27. Further, at the third mounting position E3, a port 23a is connected to a port 21d at the first mounting position E1 by a wire 28, and a port 23b is connected to a port 22d of the second mounting position E2 by wire 29.

Moreover, in the present example, the order in which the electronic devices 2 are coupled to the vehicle body at the mounting positions is associated in advance with ON/OFF combinations of the first switching element 20a and the second switching element 20b. In the present example, the electronic devices 2 are coupled to the vehicle body in the order of, for example, vehicle body front right side, vehicle body front left side, vehicle body rear right side, and vehicle body rear left side.

When the first switching element 20a and the second switching element 20b are both "OFF", the mounting position is at the vehicle body front right side. When the first switching element 20a is "ON" and the second switching element 20b is "OFF", the mounting position is at the vehicle body front left side. When the first switching element 20a and the second switching element 20b are both "ON", the mounting position is at the vehicle body rear right side. In this manner, the coupling order is associated with the ON/OFF combination of the switching elements 20.

The operation and advantages of the electronic device 2 in accordance with the present embodiment will now be described with reference to FIGS. 5 to 7. The electronic devices 2 are mounted, for example, in a vehicle factory or the like. The present example also performs the mounting position determination of the electronic device 2 when the electric device 2 is coupled to the vehicle body at the mounting position and the power supply +B is input. In accordance with the predetermined coupling order, the first electronic device 2a is first coupled at the first mounting position E1. Then, the second electronic device 2b is coupled at the second mounting position E2. Afterwards, the third electronic device 2c is coupled at the third mounting position E3.

As shown in FIG. 5, when the first electronic device 2a is mounted at the first mounting position E1, the first switching element 20a and the second switching element 20b of the first electronic device 2a are both connected to nothing and open. Thus, the first switching element 20a and the second switching element 20b are both "OFF".

When the mounting position determination is performed (power supply +B is input) and the mounting position registration unit 15 of the first electronic device 2a acknowledges that the first switching element 20a and the second switching element 20b are both "OFF", the mounting position registration unit 15 of the first electronic device 2a determines that the mounting position of the first electronic device 2a is the first mounting position E1, that is, at the vehicle body front right side. The mounting position registration unit 15 of the first electronic device 2a stores "first mounting position E1: vehicle body front right side" as the mounting position of the first electronic device 2a in the memory 17 of the first electronic device 2a.

As shown in FIG. 6, when the second electronic device 2b is mounted at the second mounting position E2 after the first electronic device 2a has been mounted, the first switching element 20a of the second electronic device 2b is connected to the first ground terminal 13a of the first electronic device 2a and receives an input signal St from the first ground terminal 13a via the wire 26. This switches the first switching element 20a of the second electronic device 2b to "ON". The second switching element 20b of the second electronic device 2b is connected to nothing and thus remains open. Accordingly, in this case, the first switching element 20a is "ON", and the second switching element 20b is "OFF".

When the mounting position determination is performed (power supply +B is input), the mounting position registration unit 15 of the second electronic device 2b acknowledges that the first switching element 20a is "ON" and the second switching element 20b is "OFF". Then, the mounting position registration unit 15 of the second electronic device 2b determines that the mounting position of the second electronic device 2b is the second mounting position E2, that is, at the vehicle body front left side. The mounting position registration unit 15 of the second electronic device 2b stores "second mounting position E2: vehicle body front left side" as the mounting position of the second electronic device 2b in the memory 17 of the second electronic device 2b.

As shown in FIG. 7, when the third electronic device 2c is mounted after the first electronic device 2a and the second electronic device 2b have been mounted, the first switching element 20a of the third electronic device 2c is connected to the second ground terminal 13b of the first electronic device 2a and receives an input signal St from the second ground terminal 13b via the wire 28. This switches the first switching element 20a of the third electronic device 2c to "ON". Further, the second switching element 20b of the third electronic device 2c is connected to the second ground terminal 13b of the second electronic device 2b and receives an input signal St from the second ground terminal 13b via the wire 29. This switches the second switching element 20b of the third electronic device 2c to "ON". Accordingly, in this case, the first switching element 20a and the second switching element 20b are both "ON".

When the mounting position determination is performed (power supply +B is input) and the mounting position registration unit 15 of the third electronic device 2c acknowledges that both of the first switching element 20a and the second switching element 20b are "ON", the mounting position registration unit 15 of the third electronic device 2c determines that the mounting position of the third electronic device 2c is the third mounting position E3, that is, at the vehicle body rear right side. The mounting position registration unit 15 of the third electronic device 2c stores "third mounting position E3: vehicle body rear right side" as the mounting position of the third electronic device 2c in the memory 17 of the third electronic device 2c. The same procedure is performed with the other electronic devices 2 to register the mounting positions.

The electronic device of the above embodiment has the following advantages.

(4) The electronic device 2 includes at least one (two in the present example) switching element 20. The switching elements 20 are switched between ON and OFF by a content of the input signal St that is received from another electronic device 2 coupled to the coupling subject 7 (vehicle 1) depending on whether that electronic device 2 has been coupled. The mounting position registration unit 15 determines and registers the mounting positions based on the predetermined coupling order of the electronic devices 2 and the ON/OFF combination of the switching elements 20. This allows the mounting position of each electronic device 2 to be determined and registered by simply setting the ON/OFF of the switching elements 20 arranged on the electronic device 2. Thus, the mounting position registration of the electronic device 2 is further simplified.

The present embodiment may be modified as follows. The present embodiments and the following modifications can be combined as long as the combined modifications remain technically consistent with each other.

In the first embodiment, a low signal does not have to be received from the ground terminal 13. For example, a low signal output from a computer processing unit (CPU) may be used.

In the first embodiment, for example, the wire 14 may extend from the power supply +B so that a high signal is input to the terminal 9, and the high signal may be used as a parameter for the mounting position determination. In this case, the position may be determined from, for example, a combination of a high signal and an open signal or a combination of a high signal and a low signal.

The first embodiment may use three or more terminals 9 and determine the mounting positions from a combination of an open state, a low signal receiving state, and a high signal receiving state.

In the first embodiment, a high signal does not have to be received from the power supply terminal 12. For example, a high signal output from a CPU may be used.

In the first embodiment, an input signal St received at the power supply terminal 12 and an input signal St received at the ground terminal 13 may be used to determine the mounting positions.

In the second embodiment, the switching element 20 is not limited to a transistor and may be any element that can be switched ON and OFF.

In the second embodiment, the switching element 20 does not have to be switched on by connecting to the first ground terminal 13a or the second ground terminal 13b of another electronic device 2. Alternatively, the switching element 20 may be connected to a terminal that receives a voltage for switching the element on.

In the second embodiment, the number of the mounting positions of the electronic devices 2 is not limited to three as shown in the drawing and may be two, four, or more.

In each embodiment, distance measurement communication does not have to be performed through UWB communication as long as radio waves are transmitted and received so that the positional relationship of two devices can be measured from the propagation time of the radio waves.

In each embodiment, the number of the terminals 9 used for the mounting position determination is not limited to two and may be three or greater.

In each embodiment, the table 16 does not have to be used for the mounting position determination. The mounting position determination may be changed to use, for example, a calculation equation.

In each embodiment, any terminal 3 may be used as long as it is an electronic key having a key functionality or a high-performance portable terminal having a key functionality.

In each embodiment, identical in shape means one device cannot be distinguished by shape from another.

In each embodiment, the electronic devices 2 do not have to have the same shape and may be shaped differently.

In each embodiment, each electronic device 2 may include various types of members other than a communication device.

In each embodiment, the coupling subject 7 is not limited to the vehicle 1 and may be changed to other device or apparatus.

In the above embodiments, the mounting position registration unit may include one or more exclusive circuits or one or more processors. Further, the electronic device 2 includes the memory 17 (non-transitory computer-readable storage medium) that is connected to the one or more processors. The memory 17 may store one or more programs including commands that are executable by the one or more processors. Therefore, a non-transitory computer-readable storage medium that stores such a program can also be provided in accordance with the present disclosure.

All features disclosed in the specification and/or the claims are to be disclosed separately and independently of each other for the purpose of the original disclosure and for the purpose of limiting the invention described in the scope of claims independently of the combinations of the features in the embodiments and/or the claims. All descriptions of numerical ranges or sets of components discloses all possible intermediate values or intermediate components for the purpose of the original disclosure and for the purpose of limiting the invention described in the scope of the claims, especially as limitations of the numerical ranges.

The technical aspect that is understood from the above-described embodiments and the modified examples will be described below.

(a) A mounting position registration system that registers mounting positions of identically shaped electronic devices coupled to a coupling subject at the mounting positions for use, where the system includes terminals and a mounting position registration unit that determines and registers the mounting positions based on a combination of input states of the terminals that receive input signals.

DESCRIPTION OF THE REFERENCE NUMERALS 1) vehicle; 2) electronic device; 9) terminal; 9a) first terminal; 9b) second terminal; 7) coupling subject; 14) wire; 14a), 14b) wire; 15) mounting position registration unit; 16) table; 17) memory; 20) switching element; 20a) first switching element; 20b) second switching element; St), St1), St2) input signal.

The invention claimed is:

1. An electronic device coupled to a coupling subject at a mounting position for use, the electronic device comprising:
   terminals configured to receive input signals;
   a transceiver configured to transmit and receive radio waves; and
   a mounting position registration unit that determines and registers the mounting position based on a combination of input states of the terminals that receive the input signals,
   wherein the electronic device transmits and receives radio waves, via the transceiver, between the electronic device and a terminal device, and the electronic device measures a distance between the electronic device and the terminal device from a propagation time of the transmitted and received radio waves.

2. The electronic device according to claim 1, further comprising:
   a memory that stores a table in which an input pattern of the input signals is associated with the mounting position,
   wherein the mounting position registration unit is configured to refer to the table based on the input pattern to determine the mounting position.

3. An electronic device coupled to a coupling subject at a mounting position for use, the electronic device comprising:
   terminals configured to receive input signals; and
   a mounting position registration unit that determines and registers the mounting position based on a combination of input states of the terminals that receive the input signals, wherein
   each of the terminals includes a state disconnected from a wire and a state connected to the wire,
   wherein in the state connected to the wire, each of the terminals receives from the wire one of an input signal set at a low level and an input signal set at a high level, and
   the mounting position registration unit determines and registers the mounting position from a combination of at least three states of the terminals that includes the state disconnected from the wire, a state in which the input signal set at the low level is input, and a state in which the input signal set at the high level is input.

4. An electronic device coupled to a coupling subject at a mounting position for use, the electronic device comprising:
   terminals configured to receive input signals;
   a mounting position registration unit that determines and registers the mounting position based on a combination of input states of the terminals that receive the input signals; and at least one switching element connected to at least one of the terminals and switched between on and off by a content of an input signal that is from an other electronic device coupled to the coupling subject depending on whether the other electronic device is coupled, wherein the mounting position registration unit determines and registers the mounting position based on a coupling order of the electronic device that is determined in advance and an on/off combination of the at least one switching element.

* * * * *